(12) United States Patent
Fujimoto (10) Patent No.: US 7,894,138 B2
(45) Date of Patent: Feb. 22, 2011

(54) DISPLAY OPTICAL SYSTEM AND IMAGE DISPLAY APPARATUS INCLUDING THE SAME

(75) Inventor: Makoto Fujimoto, Katsushika-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/755,397

(22) Filed: May 30, 2007

(65) Prior Publication Data

US 2007/0279744 A1 Dec. 6, 2007

(30) Foreign Application Priority Data

Jun. 6, 2006 (JP) ............................... 2006-157258

(51) Int. Cl.
*G02B 27/10* (2006.01)
(52) U.S. Cl. ..................................... 359/618
(58) Field of Classification Search ................. 359/618, 359/831–834, 822, 802
See application file for complete search history.

(56) References Cited

U.S. PATENT DOCUMENTS 5,680,200 A * 10/1997 Sugaya et al. ................. 355/53
6,128,144 A * 10/2000 Togino ........................ 359/728
7,012,756 B2   3/2003 Takagi et al.
6,643,062 B1 * 11/2003 Kamo ......................... 359/431
7,057,818 B2 *  6/2006 Hamano et al. ............. 359/557

FOREIGN PATENT DOCUMENTS

| JP | 10-153748 | | 6/1998 |
| JP | 2002-244037 | * | 8/2002 |
| JP | 2002244037 A | * | 8/2002 |

* cited by examiner

*Primary Examiner*—Ricky L Mack
*Assistant Examiner*—Vipin M Patel
(74) *Attorney, Agent, or Firm*—Canon U.S.A., Inc. I.P. Division

(57) ABSTRACT

At least one exemplary embodiment is directed to a display optical system which includes a first optical system configured to form a magnified image of an image displayed on an image display element, the first optical system including an optical member, a second optical system configured to magnify and guide light of the magnified image from the first optical system to one of an observer or a projection surface, the second optical system including a decentered reflecting surface, and an adjusting mechanism configured to displace the optical member of the first optical system in such a way as to have a component in a direction perpendicular to an optical axis of the first optical system.

6 Claims, 4 Drawing Sheets

DISPLAY OPTICAL SYSTEM AND IMAGE DISPLAY APPARATUS INCLUDING THE SAME

BACKGROUND OF THE INVENTION

1. Field of the Invention

The present invention relates to a display optical system, and in particular, though not exclusively, to a display optical system configured to be incorporated in a head mounted display or in a liquid crystal projector or included in an image display apparatus.

2. Description of the Related Art

A head mounted display includes an image display element, such as a cathode-ray tube (CRT) or a liquid crystal display (LCD), and an optical system capable of enlarging an image displayed on the image display element.

The head mounted display is generally compact and lightweight. In particular, the head mounted display is required to be thin enough in a direction parallel to the visual axis of an observer to assure a desirable weight balance and good appearance when mounted on the head of the observer.

Furthermore, the head mounted display is required to display a sufficiently large size of image so as to include strong visuals.

To satisfy such requirements, there is a one-time image forming display optical system which uses a decentered reflecting surface.

As discussed in Japanese Patent Application Laid-Open No. 10-153748, a display optical system includes a prism body having decentered reflecting surfaces and a relay lens unit. Light from an image displayed on an image display element enters the prism body via the relay lens unit and forms an intermediate image therein so that an observer can view the image displayed on the image display element.

As discussed in U.S. Pat. No. 7,012,756, a prism body includes three different decentered reflecting surfaces, between which a light flux can repeatedly reflect to provide a long optical path length capable of forming an intermediate image in a compact optical system. Thus, the overall size of the display optical system becomes compact, and an image having a wide angle of view can be displayed with a compact image display element.

A display optical system using a decentered reflecting surface is useful in that a compact body is realized and higher optical characteristics can be easily attained.

However, the optical characteristics may easily deteriorate if optical elements (e.g., a prism body or lens) and a lens barrel of the display optical system have fabrication or manufacturing errors. In particular, a decentered reflecting surface requires higher decentering accuracy not comparable to that for a refracting surface.

For example, if a prism body having decentered reflecting surfaces discussed in Japanese Patent Application Laid-Open No. 10-153748 or U.S. Pat. No. 7,012,756 has errors in relative position, various aberrations including decentration coma and astigmatism will be generated and, as a result, the resolution will deteriorate and desired optical characteristics cannot be obtained.

Therefore, to satisfy requirements for higher decentering accuracy, optical elements and lens barrels are strictly required to have extremely higher fabrication accuracy. Thus, the manufacturing cost significantly increases. The optical system discussed in Japanese Patent Application Laid-Open No. 10-153748 or U.S. Pat. No. 7,012,756 may not be suitable for mass production.

SUMMARY OF THE INVENTION

Exemplary embodiments of the present invention are directed to a display optical system capable of reducing decentration aberration and realizing higher optical characteristics without requiring higher fabrication accuracy. Furthermore, exemplary embodiments of the present invention are directed to an image display apparatus including the display optical system.

According to an aspect of at least one exemplary embodiment of the present invention, a display optical system includes a first optical system configured to form a magnified image of an image displayed on an image display element, the first optical system including an optical member, a second optical system configured to magnify and guide light of the magnified image from the first optical system to one of an observer or a projection surface, the second optical system including a decentered reflecting surface, and an adjusting mechanism configured to displace the optical member of the first optical system in such a way as to have a component in a direction perpendicular to an optical axis of the first optical system.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, and features of the invention and, together with the description, serve to explain at least some of the principles of the invention.

DETAILED DESCRIPTION OF THE EMBODIMENTS

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

It is noted that throughout the specification, similar reference numerals and letters refer to similar items in the following figures, and thus once an item is described in one figure, it may not be discussed for following figures.

Various exemplary embodiments will be described in detail below with reference to the drawings.

Figure 1:
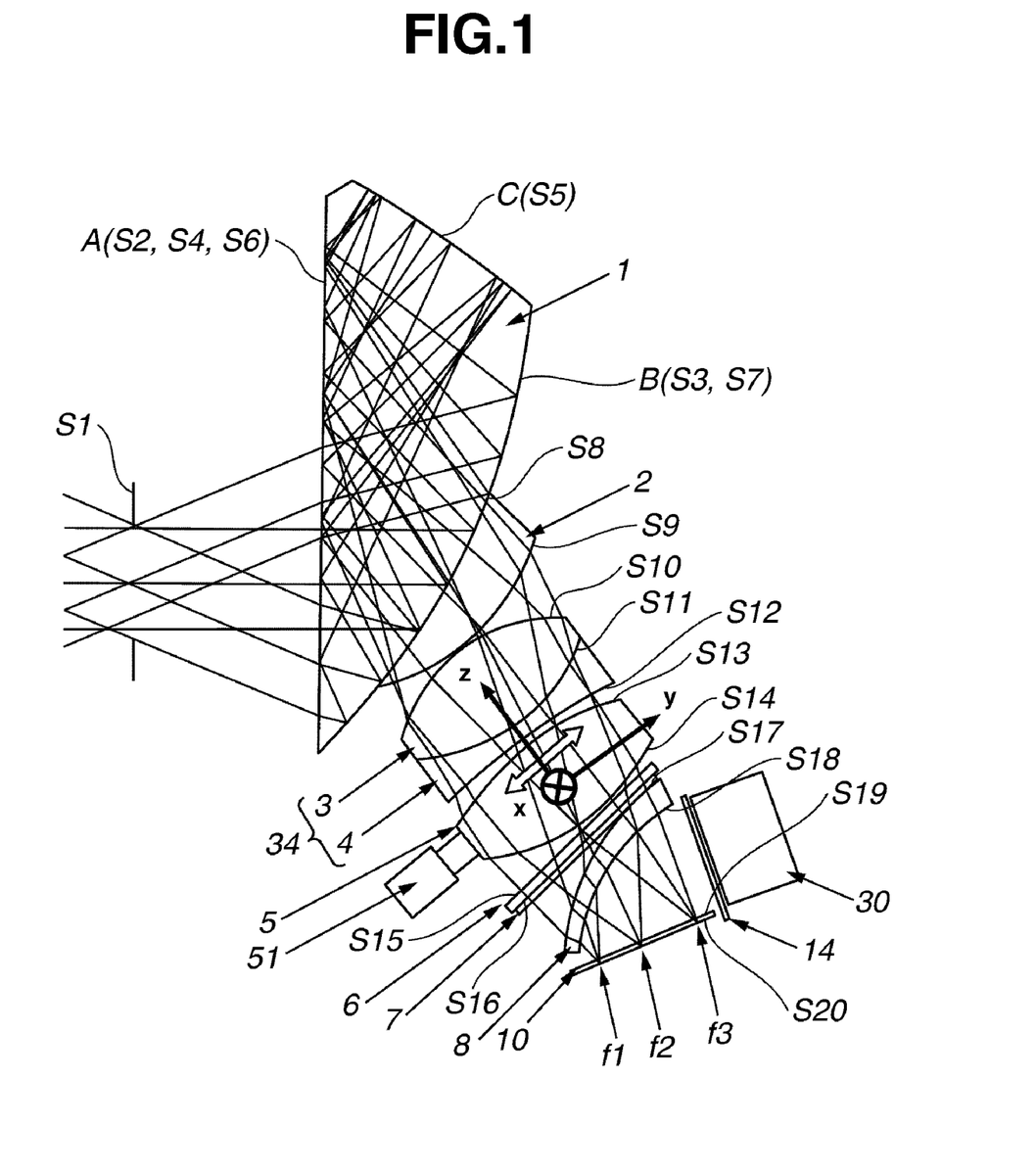
FIG. 1 illustrates an exemplary image display apparatus including a display optical system according to an exemplary embodiment.

FIG. 1 illustrates an image display apparatus including a display optical system according to an exemplary embodiment. More specifically, the image display apparatus according to an exemplary embodiment is a head mounted display.

The head mounted display illustrated in FIG. 1 includes a prism body 1 (i.e., an optical element) having three or more optical surfaces on a transparent medium having a refractive index greater than about 1.

The prism body 1 according to the present exemplary embodiment has a first optical surface A, a second optical surface B, and a third optical surface C. The optical surface A corresponds to surfaces S2, S4, and S6. The optical surface B corresponds to surfaces S3 and S7. The optical surface C corresponds to a surface S5.

Each of the optical surfaces A, B, and C is a refracting surface and/or a reflecting surface having a curvature. In the following description, the optical surfaces A, B, and C may be simply referred to as surfaces A, B, and C.

The head mounted display illustrated in FIG. 1 includes another prism body 2 (i.e., an optical element) having two optical surfaces S8 and S9 on a transparent medium having a refractive index greater than 1. The prism body 1 and the prism body 2 are cemented together.

The head mounted display illustrated in FIG. 1 further includes a lens 3 having refracting surfaces S10 and S11, and a lens 4 having refracting surfaces S11 and S12. The lens 3 and the lens 4 can be cemented together to constitute a cemented lens 34.

The head mounted display illustrated in FIG. 1 further includes a lens 5 having refracting surfaces S13 and S14, a flat plate 6 having flat surfaces S15 and S16, a polarizing plate 7, and a decentered cylindrical lens 8 having surfaces S17 and S18. The surface S18 of the cylindrical lens 8 can be a transmitting/reflecting surface (i.e., a half mirror).

An image display element 10 can display an image. The image display element 10 according to the present exemplary embodiment is a reflection-type liquid crystal display (LCD). A cover glass of the LCD 10 has surfaces S19 and S20. The surface S20 serves as an image display surface of the LCD 10.

The LCD 10 can be replaced by another image display element, such as a cathode-ray tube (CRT) or an electroluminescence (EL) element.

An illumination unit 30 includes a flat surface light source. Light emitted from the illumination unit 30 can reach the LCD 10 via the surface S18 of the cylindrical lens 8. In this respect, the surface S18 of the cylindrical lens 8 functions as an element of an illumination optical system.

The display optical system has an exit pupil S1, where the eye of an observer is positioned. Except the cemented lens 34 and the cylindrical lens 8, each surface of the optical members 1, 2, and 5 can be plane-symmetric with respect to the drawing surface of FIG. 1 (i.e., yz section) serving as a symmetry plane.

Light emitted from the illumination unit 30 passes through a polarizing plate 14 and travels as linearly polarized light. The linearly polarized light reflects on the surface S18 of the cylindrical lens 8. The reflected light advances towards the LCD 10. The light falls obliquely on the surface of the reflection-type LCD 10. Then, the light obliquely reflects on the LCD 10 and enters the cylindrical lens 8 via the surface S18. The light having passed through the cylindrical lens 8 exits from the surface S17.

Then, the light passes through the polarizing plate 7 and enters the flat plate 6 via the surface S16. The light having passed through the flat plate 6 exits from the surface S15. Then, the light enters the lens 5.

In this case, the polarization direction of the light linearly polarized by the polarizing plate 14 rotates in a liquid crystal thereof. Therefore, the polarizing plate 7 is set to have a predetermined polarizing direction such that the light having a rotated polarization direction can pass through the polarizing plate 7.

When the linearly polarizing direction of the polarizing plate 7 is about perpendicular (approximately 90°) to the linearly polarizing direction of the polarizing plate 14 (i.e., when the rotation of the polarization direction in the liquid crystal is approximately 90°), the light linearly polarized by the polarizing plate 14 can become ghost light that does not reflect on the surface S18 of the cylindrical lens 8 and passes through the cylindrical lens 8. The polarizing plate 7 can cut the ghost light and prevent the ghost light from reaching an observer's eye (exit pupil S1).

The light, after having passed through the lens 5 via the entrance surface S14 and the exit surface S13, enters the lens 4 via the surface S12. The light passes through the cemented surface S11 of the lens 4 and the lens 3 and exits from the surface S10. Then, the light travels towards the prism body 2.

The light, after having entered the prism body 2 via the surface S9, passes through the cemented surface (surfaces S8, S7) of the prism body 2 and the prism body 1 and then enters the prism body 1. The light having entered the prism body 1 via the surface B (surface S7) of the prism body 1 reflects on the surface A (surface S6) and then travels towards the surface C (surface S5). The light reflects on the surface C (surface S5) and travels approximately in the opposite direction.

The light having reflected on the surface C (surface S5) again reflects on the surface A (surface S4) and then reflects on the surface B (surface S3). The light then exits from the prism body 1 via the surface A (surface S2) and travels towards the exit pupil S1.

In this case, the rays arriving from both ends f1 and f3 of the image display surface (surface S20) cross each other in the prism body 1. Therefore, the display optical system illustrated in FIG. 1 can form an intermediate imaging plane (i.e., an intermediate image) of an image displayed on the image display surface S20.

In the present exemplary embodiment, an intermediate image can be formed between the reflection at the surface S4 and the reflection at the surface S5, although the formation of an intermediate image is not limited to the illustrated example.

Furthermore, the present exemplary embodiment can easily apply an aberration correction to an eyepiece optical system section (i.e., surfaces S5, S4, S3, and S2) that guides the light from the intermediate imaging plane as an approximately parallel ray to the exit pupil S1. More specifically, an intermediate image formed on the intermediate imaging plane has an appropriate curvature or an astigmatic difference according to curvature of field or astigmatism occurring in the eyepiece optical system section.

The surfaces (i.e., surface S5, surface S4, surface S3, and surface S2) subsequent to the intermediate imaging plate contribute to the reflection of the light on the surface S5 and the exiting of the light from the surface S2 and, accordingly, can be regarded as corresponding to an eyepiece optical system (i.e., an eyepiece system).

The rest of the prism body 1 (i.e., surface S7 and surface S6) and the optical system (members 2 through 8) disposed between the prism body 1 and the cover glass (surface S19 and surface S20) of the LCD 10 are regarded as corresponding to a relay optical system (i.e., a relay system).

In the present exemplary embodiment, the relay optical system is referred to as a first optical system while the eyepiece optical system is referred to as a second optical system.

The surface S3 serving as a final reflecting surface is a concave mirror having a very strong power compared to that of the surface S2 serving as an exit surface. The eyepiece optical system may not completely correct aberrations. Thus, the relay optical system forms an intermediate image so that an intermediate imaging plane is formed in such a way as to cancel the aberrations occurring in the eyepiece optical system. Thus, the present exemplary embodiment can improve the image quality in the final image observation.

If the reflection on the surface S4 is a total internal reflection in the prism body 1, the light quantity loss can be reduced. It is useful that the reflection light flux is subjected to the total internal reflection at least in a region commonly used by the exit light flux on the surface S2 and the reflection light flux on the surface S4. Because, compared to a case where all of the reflection light flux is subjected to the total internal reflection, a large extent of freedom can be assured in the design and the brightness can be maintained at a satisfactory level.

In this case, a reflection region on the surface S4 where no total internal reflection is generated is a region corresponding to the reflection by a reflection film (e.g., Al or Ag). Furthermore, the reflection on the surface S5 is reflection by a reflection film (e.g., Al or Ag).

Furthermore, after passing through the surface B (S7) into the prism body 1, the light travels along a repetitively folded optical path successively repeating reflections on the surface A (S6)→surface C (S5)→surface A (S4)→surface B (S3) (→surface A (S2)) in this order. In this case, the light changes the traveling direction at the reflection on the surface C. Thus, before the light finally reaches the reflecting surface B, the light travels along a forward path connecting the surface B(S7)→surface A(S6)→surface C(S5) and a backward path connecting the surface C(S5)→surface A(S4)→surface B(S3).

In this respect, the surface C has a returning reflection function for switching a forward path and a backward path and can be referred to as a "return surface." As described above, the prism body 1 can fold an optical path repetitively by the plural decentered reflecting surfaces A, B, and C so as to form a forward path and a backward path (i.e., a long optical path length required for an one-time image forming system) which are substantially overlapped in a compact prism body. Therefore, the display optical system illustrated in FIG. 1 is structurally compact.

According to a conventional system not applicable to a decentering system, a coordinate system is defined based on the standard of each surface vertex, in which the z axis is equal to an optical axis, the yz section is a conventional meridional section, and the xz section is a sagittal section.

The display optical system according to the present exemplary embodiment is a decentering system. Therefore, the present exemplary embodiment newly defines a local meridional section and a local sagittal section applicable to a decentering system.

The present exemplary embodiment defines the local meridional section as a surface including incident light and exiting light of a center angle-of-view principal ray on a hit point (entrance position) of each surface of the center angle-of-view principal ray.

The "center angle-of-view principal ray" is a ray exiting from a position corresponding to the center of an image displayed on the image display element 10 and passing through the center of the exit pupil S1. The optical path of the "center angle-of-view principal ray" can be regarded as an "optical axis" in the present exemplary embodiment.

The present exemplary embodiment defines the local sagittal section as a surface which includes the hit point and which is perpendicular to the local meridional section and parallel to the sagittal section of the coordinate system of each surface vertex (ordinary sagittal section).

The present exemplary embodiment calculates a curvature in the vicinity of the hit point of the center angle-of-view principal ray on each surface, and defines a radius of curvature ry on the local meridional section and a radius of curvature rx on the local sagittal section with respect to the center angle-of-view principal ray of each surface.

In a photographic lens for a camera or other coaxial optical system, decentration coma or field tilt can be generated if a lens or a lens barrel for a lens unit is decentered. The decentration coma or field tilt can be corrected by shifting or tilting an adjusting lens.

The adjusting lens can be constructed from a lens unit or a lens constituting part of the lens unit which has higher generation sensitivity against aberrations to be corrected and lower generation sensitivity against other aberrations.

The display optical system according to the present exemplary embodiment includes a first optical system (i.e., a relay optical system) configured to form a magnified image of an image displayed on the image display element 10, and a second optical system (i.e., an eyepiece optical system) including a decentered reflecting surface and configured to further magnify an intermediate image formed by the first optical system. With the above-described arrangement, the display optical system according to the present exemplary embodiment can guide a light flux from the image display element 10 to an observer's eye or a projection surface.

According to the above-described display optical system, the second optical system has a higher decentering sensitivity due to the presence of a decentered reflecting surface. Thus, decentration coma or astigmatism is easily generated if the second optical system is not accurately positioned.

The decentration coma or astigmatism can be corrected by a mechanism for shifting or tilting all or part of the optical members constituting the second optical system.

However, if all or part of the optical members of the second optical system is moved (shifted or tilted) to perform a decentering adjustment, the incident angle of light entering the second optical system tends to greatly deviate from a desired value. As a result, the image center of the image display element 10 greatly deviates from the center position of an observer's eye approximately in the vertical direction. The observation cannot be adequately performed.

Hence, the present exemplary embodiment can include an adjusting mechanism 51 capable of displacing at least part of the optical members constituting the first optical system in such a way as to have a component (amount of displacement) in a direction perpendicular to the optical axis of the first optical system. The adjusting mechanism 51 according to the present exemplary embodiment can correct decentration aberration resulting from manufacturing errors.

For example, the adjusting mechanism 51 according to the present exemplary embodiment may simply shift an optical member of the first optical system in a direction perpendicular to the optical axis, or may tilt an optical member of the first optical system around a rotational axis perpendicular to the optical axis.

In the present exemplary embodiment, the lens 5 can function as an adjusting lens capable of adjusting optical characteristics of the display optical system if the optical characteristics deteriorate due to manufacturing errors in shape and position. The adjusting lens according to the present exemplary embodiment is not limited to a single lens, and, therefore, plural lenses can be used to adjust the optical characteristics.

The adjusting mechanism 51 can shift the lens 5 in a predetermined direction (i.e., y direction) perpendicular to the optical axis (i.e., z axis). Additionally, for example to attain a required accuracy, the adjusting mechanism 51 can be modified to shift the lens 5 in a different direction (e.g., x direction) in addition to the y direction.

Moreover, the adjusting mechanism 51 according to the present exemplary embodiment can be modified to rotate the lens 5 around the x axis or/and the y axis instead of or in addition to shifting the lens 5. For example, an exemplary adjusting mechanism according to the present exemplary embodiment can shift and rotate the lens 5. The present exemplary embodiment can employ an optimum one of the above-mentioned exemplary adjustment mechanisms based on the optical decentering sensitivity.

The present exemplary embodiment performs a decentering adjustment using the adjusting mechanism 51 capable of displacing the lens 5 and adjusts astigmatism or decentration coma resulting from manufacturing errors of optical members constituting the first or second optical system.

The decentering adjustment in the first optical system can reduce a deviation between the center of a virtual image of an image displayed on the image display element 10 and the center position of an observer's eye, which can be generated in the second optical system. Therefore, performing a decentering adjustment in the first optical system can effectively adjust the aberrations to be corrected.

The aberration, which may be generated when the positioning accuracy of an optical member is insufficient and which may deteriorate the optical characteristics, is chiefly decentration coma or astigmatism or a combination thereof depending on the characteristics of an optical system. Furthermore, if a display optical system has a wide angle of view, field tilt or curvature of field may be generated.

The surface (yz plane) serving as a symmetry plane of an optical member that includes the optical axes before and after reflections in the second optical system is greatly different in the decentering sensitivity from the surface (xy plane) perpendicular to the yz plane. More specifically, according to the display optical system illustrated in FIG. 1, the decentering sensitivity in the y direction is higher than the decentering sensitivity in the x direction. Most of decentration coma is generated in the y direction. Astigmatism greatly deviates the focus position on the Y section.

In short, the aberration generated in the optical system has directivity. Hence, the adjusting lens (i.e., lens 5) according to the present exemplary embodiment has an optical power, which varies depending on the y direction and the x direction. More specifically, the lens 5 can be formed with an optical system having a rotationally asymmetric surface. The adjusting lens 5 (i.e., an optical system having a rotationally asymmetric surface) can adequately adjust decentration aberration on each of two sections which are different in the decentering sensitivity.

Furthermore, to correction higher-order aberrations, the adjusting lens 5 can be configured to have a rotationally asymmetrical aspheric surface.

A numerical example of the present exemplary embodiment will be described below.

The leftmost item "SURF" represents a surface number which is assigned to each surface and numbered along the optical path of the light traveling from the image display element 10.

The items "X, Y, and Z" represent a position (x, y, z) of a surface vertex of each surface, when the center of the first surface S1 is an origin (0, 0, 0), in a coordinate system having the y axis, the z axis, and the x axis (extending inward from the drawing surface) illustrated in FIG. 1. The item "A" represents a rotational angle (degrees) around the x axis which increases in a counterclockwise direction.

The item "typ" represents the type of each surface in shape, where "SPH" represents a spherical surface, "FFS" represents a rotationally asymmetrical surface, "CYL" represents a cylindrical lens surface having a refractive power only on the meridional section. The rotationally asymmetrical surface according to the present exemplary embodiment can be defined by the following formula FFS.

The item "R" represents a radius of curvature. Regarding the cylindrical lens surface, the item R indicates a radius of curvature ry on the meridional section.

FFS:

$$z=(1/R)*(x^2+y^2)/(1+(1-(1+k)*(1/R)^2*(x^2+y^2))^{(1/2)})+\\c2+c4*y+c5*(x^2-y^2)+c6*(-1+2*x^2+2*y^2)+c10*\\(-2*y+3*x^2*y+3*y^3)+c11*(3*x^2*y-y^3)+c12*\\(x^4-6*x^2*y^2+y^4)+c13*(-3*x^2+4*x^4+3*y^2-\\4*y^4)+c14*(1-6*x^2+6*x^4-6*y^2+12*x^2*y^2+\\6*y^4)+c20*(3*y-12*x^2*y+10*x^4*y-12*y^3+\\20*x^2*y^3+10*y^5)+c21*(-12*x^2*y+15*x^4*y+\\4*y^3+10*x^2*y^3-5*y^5)+c22*(5*x^4*y-x^2*y^3+\\y^5)+c23*(x^6-15*x^4*y^2+15*x^2*y^4-y^6)+c24*(-\\5*x^4+6*x^6+30*x^2*y^2-30*x^4*y^2-5*y^4-30*x^2*y^4+\\6*y^6)+c25*(6*x^2-20*x^4+15*x^6-6*y^2+15*x^4*y^2+\\20*y^4-15*x^2*y^4-15*y^6)+c26*(-1+12*x^2-\\30*x^4+20*x^6+12*y^2-60*x^2*y^2+60*x^4*y^2-\\30*y^4+60*x^2*y^4+20*y^6)+$$

In the column of "typ", a numeral value suffixed to "FFS" indicates that the surface shape is a rotationally asymmetrical shape corresponding to the aspherical surface coefficient k and c described at the bottom of the table. The value c not described is 0.

"Nd" represents a refractive index at the d-line wavelength of a medium corresponding to the associated surface, while "vd" represents an Abbe number at the d-line wavelength. When the sign of the refractive index Nd changes, it indicates that the light reflects on the surface. When the medium is an air layer, the refractive index Nd is set to 1.0000 and the Abbe number vd is omitted.

In the above-described display optical system, the f3 center ray is a ray passing through the exit pupil center and a most-peripheral image height f3 far from the exit pupil S1, in an outer periphery image on a local meridional section on a display surface (image display element 10).

Furthermore, the f1 center ray is a ray passing through the exit pupil center and a most-peripheral image height f1 closer to the exit pupil S1. The f2 center ray is a ray passing through the exit pupil center and an intermediate image height f2.

In this case, a surface parallel to the xy plane of an optical surface of the cemented lens 34 positioned far from the image display surface S20 and passing through a crossing point of the f3 center ray and the f1 center ray is referred to as a pupil imaging plane.

The numerical values in the later-described numerical example are expressed by using the dimension of mm.

According to the numerical example, the display optical system can display an image having an image size approximately equal to 18 mm×14 mm and a horizontal angle of view equal to 60° at an infinite distant point in the z axis direction. The pupil diameter required for enabling an arbitrary observer to view an image having a horizontal angle of view equal to 60° is 14 mm.

(Numerical Example)

| SURF | X | Y | Z | A | R | typ | Nd | νd |
|---|---|---|---|---|---|---|---|---|
| 1 | 0.000 | 0.000 | 0.000 | 0.000 | 0.0000 | SPH | 1.0000 | 0.0 |
| 2 | 0.000 | 9.365 | 21.886 | −0.529 | −284.2114 | FFS1 | 1.5300 | 55.8 |
| 3 | 0.000 | −2.638 | 34.455 | −31.052 | −72.0536 | FFS2 | −1.5300 | 55.8 |
| 4 | 0.000 | 9.365 | 21.886 | −0.529 | −284.2114 | FFS1 | 1.5300 | 55.8 |
| 5 | 0.000 | 30.738 | 47.306 | 48.060 | −189.3367 | FFS3 | −1.5300 | 55.8 |
| 6 | 0.000 | 9.365 | 21.886 | −0.529 | −284.2114 | FFS1 | 1.5300 | 55.8 |
| 7 | 0.000 | −2.638 | 34.455 | −31.052 | −72.0536 | FFS2 | 1.5300 | 55.8 |
| 8 | 0.000 | −2.638 | 34.455 | −31.052 | −72.0536 | FFS2 | 1.5300 | 55.8 |
| 9 | 0.000 | −5.791 | 39.117 | −46.389 | −56.9404 | FFS4 | 1.0000 | |
| 10 | 0.000 | −7.538 | 37.525 | −53.721 | 18.2091 | SPH | 1.4875 | 70.2 |
| 11 | 0.000 | −16.105 | 43.813 | −53.721 | −21.5267 | SPH | 1.7618 | 26.5 |
| 12 | 0.000 | −17.556 | 44.878 | −53.721 | 66.0282 | SPH | 1.0000 | |
| 13 | 0.000 | −18.692 | 44.573 | −50.460 | 20.6510 | FFS5 | 1.5300 | 55.8 |
| 14 | 0.000 | −32.859 | 25.439 | −88.990 | −118.4382 | FFS6 | 1.0000 | |
| 15 | 0.000 | −49.433 | 29.812 | −45.448 | ∞ | SPH | 1.5230 | 58.6 |
| 16 | 0.000 | −50.288 | 30.654 | −45.448 | ∞ | SPH | 1.0000 | |
| 17 | 0.000 | −32.898 | 51.561 | −24.427 | 25.6080 | CYL | 1.7618 | 26.5 |
| 18 | 0.000 | −30.463 | 55.740 | −38.300 | 21.8260 | CYL | 1.0000 | |
| 19 | 0.000 | −38.215 | 64.167 | −66.742 | ∞ | SPH | 1.5500 | 52.0 |
| 20 | 0.000 | −38.858 | 64.443 | −66.742 | ∞ | SPH | 1.0000 | |
| 21 | 0.000 | −38.858 | 64.443 | −66.742 | 0.0000 | SPH | 1.0000 | 0.0 |

FFS1

$c_1$: 4.7708e+001   $c_5$: −2.2635e−003   $c_6$: −2.6964e−004   $c_{10}$: −3.5045e−006
$c_{11}$: −1.8961e−005   $c_{12}$: −2.5872e−007   $c_{13}$: −3.5080e−007   $c_{14}$: −1.8809e−007
$c_{20}$: −8.5708e−010   $c_{21}$: −5.5035e−010   $c_{22}$: −4.8677e−010   $c_{23}$: 1.7886e−011
$c_{24}$: 2.5426e−011   $c_{25}$: 1.2297e−011   $c_{26}$: 6.2276e−012

FFS2

$c_1$: −8.0283e−001   $c_5$: −1.3225e−003   $c_6$: −3.2740e−004   $c_{10}$: −1.0438e−005
$c_{11}$: −4.7937e−007   $c_{12}$: −5.0068e−008   $c_{13}$: −6.2302e−008   $c_{14}$: 4.5234e−008
$c_{20}$: 1.9842e−009   $c_{21}$: −5.0837e−010   $c_{22}$: 1.1409e−009   $c_{23}$: 1.8477e−011
$c_{24}$: 1.7819e−011   $c_{25}$: 1.2831e−011   $c_{26}$: −2.0655e−011

FFS3

$c_1$: 2.6924e+001   $c_5$: 2.4531e−004   $c_6$: −1.2389e−003   $c_{10}$: −4.7294e−005
$c_{11}$: 3.6501e−005   $c_{12}$: 2.1833e−006   $c_{13}$: −2.0621e−006   $c_{14}$: 1.3400e−006
$c_{20}$: −3.4331e−008   $c_{21}$: 2.1762e−008   $c_{22}$: −5.5534e−009   $c_{23}$: −2.7291e−010
$c_{24}$: −2.2240e−010   $c_{25}$: −2.8204e−010   $c_{26}$: 2.0643e−011

FFS4

$c_1$: −2.0112e+000   $c_5$: −1.1439e−003   $c_6$: −7.0182e−003   $c_{10}$: 6.6323e−005
$c_{11}$: 3.7827e−005   $c_{12}$: −3.0764e−007   $c_{13}$: −1.2255e−007   $c_{14}$: 2.8074e−007
$c_{20}$: −4.8304e−008   $c_{21}$: −6.8627e−009   $c_{22}$: 1.4540e−008   $c_{23}$: 1.9275e−010
$c_{24}$: −2.0887e−010   $c_{25}$: −6.5050e−010   $c_{26}$: 1.3565e−010

FFS5

$c_1$: 8.3170e−001   $c_5$: 2.2565e−003   $c_6$: −1.7932e−003   $c_{10}$: 4.9769e−005
$c_{11}$: 5.8833e−005   $c_{12}$: −1.8053e−006   $c_{13}$: 3.0888e−007   $c_{14}$: −2.4892e−006
$c_{20}$: −1.1149e−008   $c_{21}$: −5.0541e−008   $c_{22}$: 3.6852e−008   $c_{23}$: 1.3332e−009
$c_{24}$: −1.1902e−009   $c_{25}$: −7.4560e−011   $c_{26}$: −9.7807e−009

FFS6

$c_1$: 5.0873e−001   $c_5$: 1.7979e−003   $c_6$: 1.0845e−003   $c_{10}$: −4.0100e−005
$c_{11}$: −2.0713e−004   $c_{12}$: 3.9779e−006   $c_{13}$: 1.4457e−006   $c_{14}$: −2.9702e−007
$c_{20}$: −5.7229e−009   $c_{21}$: 2.9933e−008   $c_{22}$: −3.2629e−008   $c_{23}$: −5.6700e−011
$c_{24}$: −1.7802e−010   $c_{25}$: −2.0885e−010   $c_{26}$: −3.8998e−011

Figure 2:
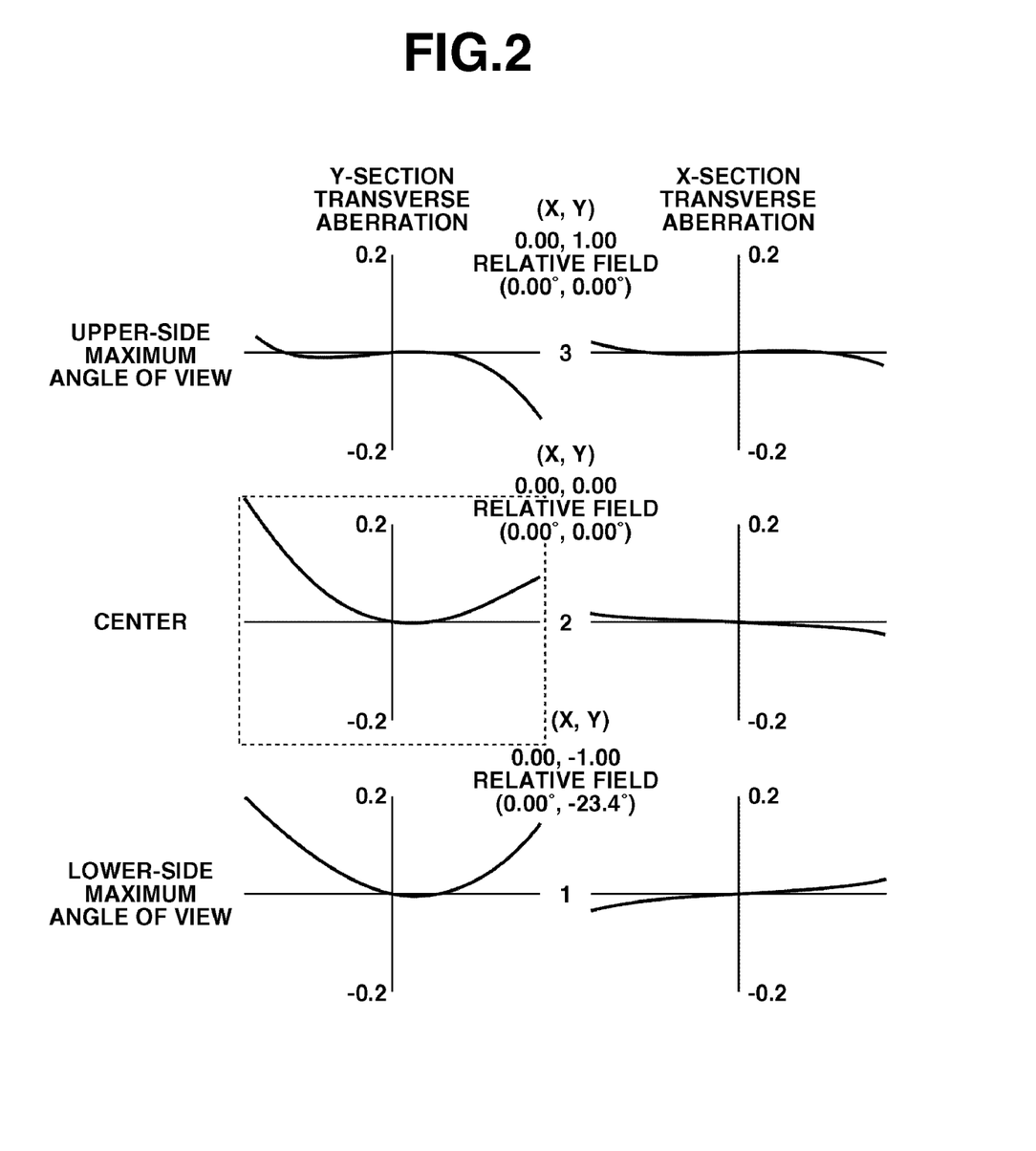
FIG. 2 illustrates transverse aberrations occurring before a decentering adjustment is performed in the display optical system according to an exemplary embodiment.
Figure 3:
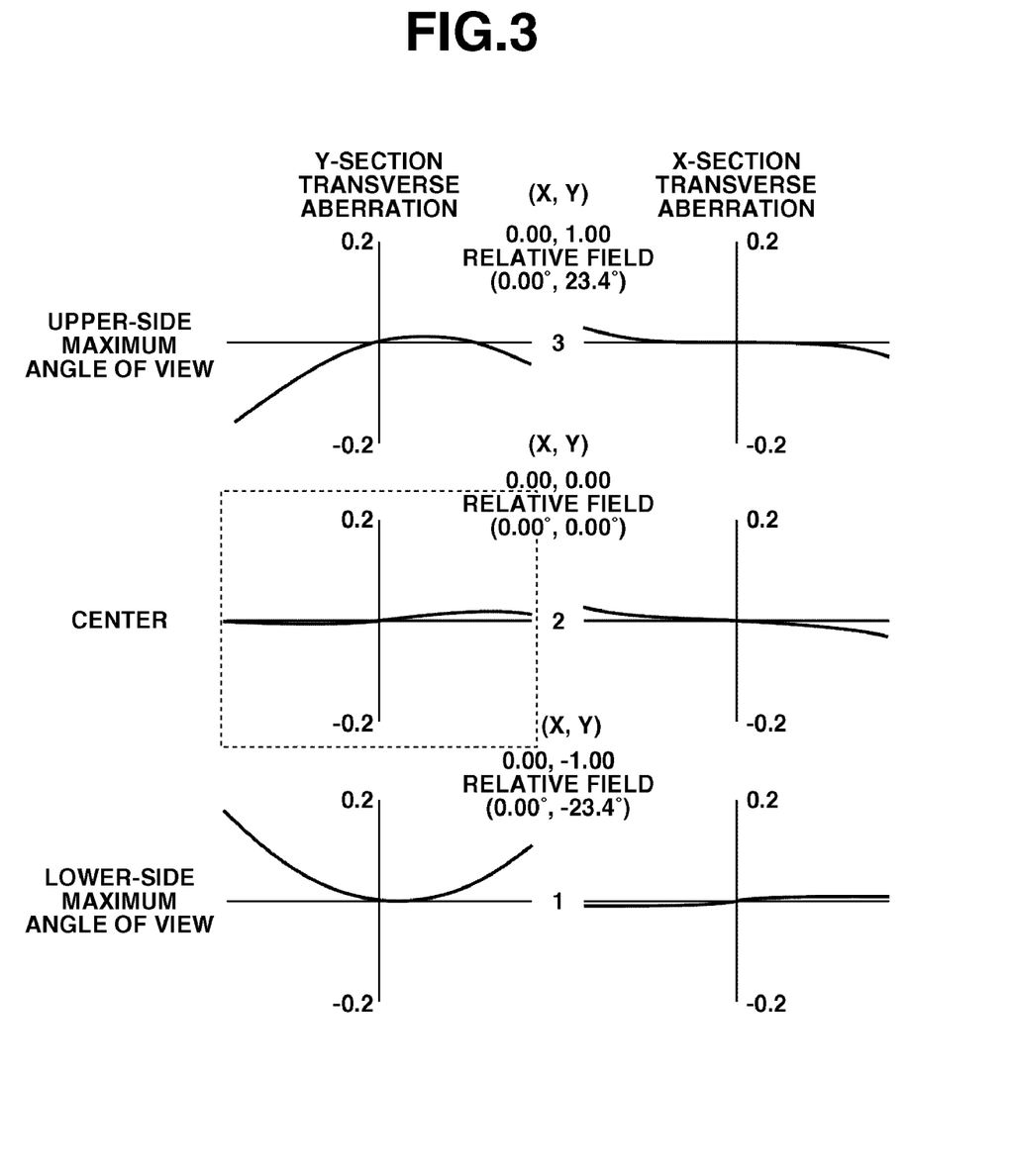
FIG. 3 illustrates transverse aberrations occurring after the decentering adjustment is performed in the display optical system according to an exemplary embodiment.

FIG. 2 illustrates transverse aberrations on the Y section and the X section with respect to axial decentration coma generated due to positioning errors of the second optical system. FIG. 3 illustrates transverse aberrations on the Y section and the X section generated after the decentration coma illustrated in FIG. 2 has been corrected by shifting an adjusting lens (i.e., lens 5) in the y direction.

As apparent from FIGS. 2 and 3, the present exemplary embodiment can adequately correct axial decentration coma if such aberration is generated due to the positioning errors resulting from design values.

Figure 4:
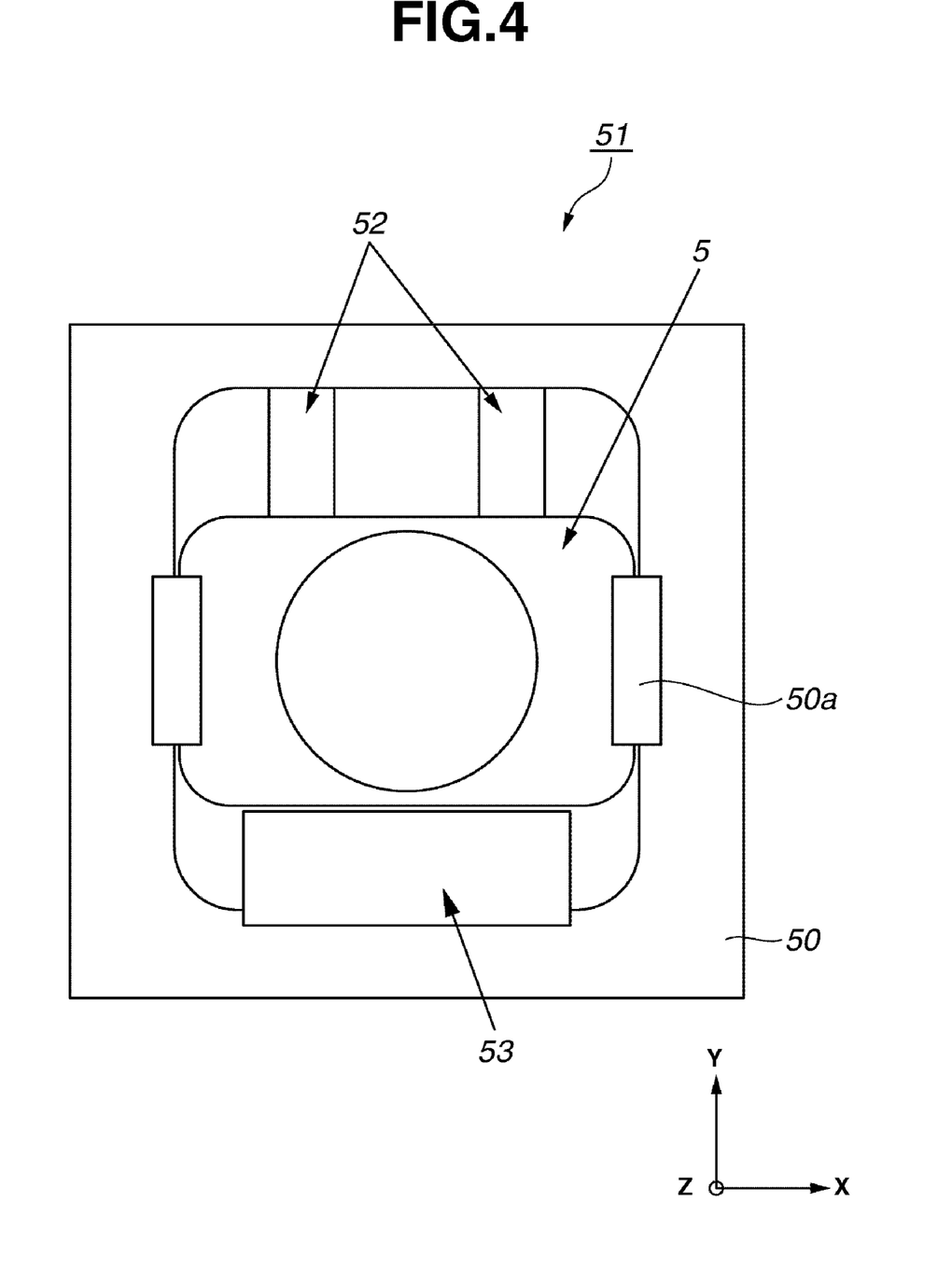
FIG. 4 illustrates a decentering adjusting mechanism for a display optical system according to an exemplary embodiment.

FIG. 4 illustrates an adjusting mechanism 51 capable of shifting the lens 5 in the y direction. The lens 5 can slide along a pair of guide portions 50a and shift in the y direction relative to a lens barrel 50. The adjusting mechanism 51 includes a spring 52 which can resiliently press the lens 5 in one direction and a spacer 53 disposed at the opposite side of the spring 52. The decentering adjustment in the y direction can be performed by replacing the spacer 51 with another spacer having a different thickness.

The decentering adjustment in the x direction can also be performed if the adjusting mechanism 51 illustrated in FIG. 4 is also provided in the x direction.

When the image display apparatus according to the present exemplary embodiment is used as a projector, the first and second optical systems can project, on a projection surface, a magnified real image of an image displayed on the image display element 10. An observer can observe the magnified real image.

As described above, the present exemplary embodiment can include a display optical system capable of reducing generation of decentration aberration and enabling an observer to view a displayed image with higher optical characteristics.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-157258 filed Jun. 6, 2006, which is hereby incorporated by reference herein in its entirety.

What is claimed is:

1. A display optical system comprising:
a first optical system configured to form a magnified image of an image displayed on an image display element;
a second optical system configured to magnify and guide light of the magnified image from the first optical system to one of an observer or a projection surface, the second optical system including a decentered reflecting surface; and
an adjusting mechanism configured to decenter at least one optical member of a plurality of optical members constituting the first optical system in such a way as to have a component in a direction perpendicular to an optical axis of the first optical system to reduce decentration aberration resulting from manufacturing errors in said plurality of optical members constituting the first optical system or in optical members constituting the second optical system,
wherein the at least one optical member decentered by the adjusting mechanism includes a rotationally asymmetric surface.

2. The display optical system according to claim 1, wherein the rotationally asymmetric surface is a rotationally asymmetric aspheric surface.

3. The display optical system according to claim 1, wherein the adjusting mechanism is configured to shift the optical member in a direction perpendicular to the optical axis.

4. The display optical system according to claim 1, wherein the adjusting mechanism is configured to tilt the optical member around a rotational axis perpendicular to the optical axis.

5. The display optical system according to claim 1, wherein the second optical system including the decentered reflecting surface includes a prism body having a first surface, a second surface, and a third surface, and
wherein light having entered the prism body via the first surface sequentially reflects on the second surface and the third surface, and the light further sequentially reflects on the second surface and the first surface and exits from the second surface.

6. An image display apparatus comprising:
the display optical system according to claim 1; and
an image display element configured to display an image,
wherein the display optical system is configured to allow the image displayed on the image display element to be observed.

* * * * *